(12) United States Patent
Zhou (10) Patent No.: US 11,735,901 B2
(45) Date of Patent: Aug. 22, 2023

(54) SHORT PROTECTION CIRCUIT WITH A HICCUP PROTECTION MODE AND THE METHOD THEREOF

(71) Applicant: Chengdu Monolithic Power Systems Co., Ltd., Chengdu (CN)

(72) Inventor: Yong Zhou, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 155 days.

(21) Appl. No.: 17/363,899

(22) Filed: Jun. 30, 2021

(65) Prior Publication Data

US 2022/0014009 A1   Jan. 13, 2022

(30) Foreign Application Priority Data

Jul. 7, 2020   (CN) .......................... 202010650134.3

(51) Int. Cl.
*H02H 3/06*   (2006.01)
*H02H 3/093*   (2006.01)
*H02H 7/10*   (2006.01)

(52) U.S. Cl.
CPC ............ *H02H 3/066* (2013.01); *H02H 3/093* (2013.01); *H02H 7/10* (2013.01)

(58) Field of Classification Search
CPC .......... H02H 3/066; H02H 3/093; H02H 7/10
USPC .......................................................... 361/97
See application file for complete search history.

(56) References Cited

U.S. PATENT DOCUMENTS

| | | | | |
|---|---|---|---|---|
| 6,411,483 | B1 * | 6/2002 | Sarles ................... | H02M 3/156 |
| | | | | 361/18 |
| 6,680,837 | B1 * | 1/2004 | Buxton .................. | H02H 3/087 |
| | | | | 327/309 |
| 9,496,780 | B2 * | 11/2016 | Warnes ................... | H02M 1/08 |
| 9,608,509 | B2 * | 3/2017 | Xu .......................... | H02M 1/36 |

* cited by examiner

*Primary Examiner* — Yemane Mehari
(74) *Attorney, Agent, or Firm* — Perkins Coie LLP (57) ABSTRACT

A short protection method for a power converter having an output terminal for providing an output voltage. The power converter works in a hiccup protection mode when a short fault occurs. The hiccup protection mode has a sleep stage and a reset stage, the short protection method detects the output voltage during the hiccup protection mode and sets the time period of the reset stage based on the detected output voltage. The time period of the reset stage increases with the increase of the detected output voltage.

19 Claims, 5 Drawing Sheets

SHORT PROTECTION CIRCUIT WITH A HICCUP PROTECTION MODE AND THE METHOD THEREOF

CROSS-REFERENCE TO RELATED APPLICATIONS

This application claims the benefit of Chinese Patent Application No. 202010650134.3, filed on Jul. 7, 2020, which is incorporated herein by reference in its entirety.

TECHNICAL FIELD

This disclosure generally relates to a short protection circuit, and more particularly but not exclusively relates to a short protection circuit with a hiccup protection mode and the method thereof.

BACKGROUND

Today, short protection circuits are widely used in power converters to protect the power converters against damage when the power converters have short faults, and the hiccup protection mode is deemed as a preferable solution used in the short protection circuits since it can greatly reduce the power loss during the short faults.

Figure 1:
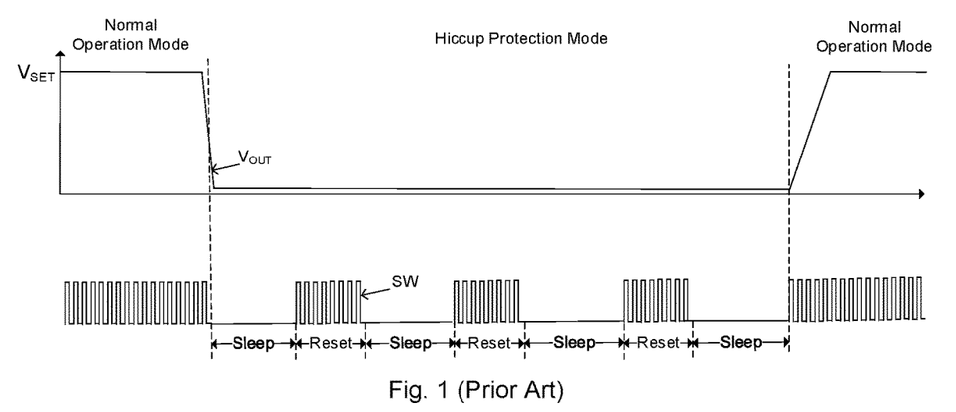
FIG. 1 illustrates a waveform diagram of a prior art power converter working in a hiccup protection mode when a short fault occurs.

FIG. 1 illustrates a waveform diagram of a prior art power converter working in a hiccup protection mode when a short fault occurs. The power converter is configured to provide an output voltage $V_{OUT}$ and comprises at least one switch with a switching control signal SW configured to control on and off switching of the at least one switch. The power converter works in the hiccup protection mode when the short fault occurs and works in a normal operation mode when the short fault is removed. For the power converter in FIG. 1, when the output voltage $V_{OUT}$ is lower than a fault voltage reference, which indicates that the power converter has the short fault, the power converter enters the hiccup protection mode. When the short fault is removed, the power converter exits the hiccup protection mode and enters the normal operation mode. When the power converter works in the normal operation mode, the at least one switch is controlled to be switched on and off for maintaining the output voltage $V_{OUT}$ at a predetermined voltage reference $V_{SET}$. The waveforms of the output voltage $V_{OUT}$ and the switching control signal SW are all shown for better understanding the hiccup protection mode. As FIG. 1 shown, the hiccup protection mode comprises sleep stages and reset stages, and the reset stages alternates with the sleep stages during the hiccup protection mode. When the power converter works in the sleep stage, the at least one switch is controlled to be turned off, and the switching control signal SW is latched to be low, and when the power converter works in the reset stage, the at least one switch is controlled to be switched on and off, and the switching control signal SW is a square signal.

For the power converter illustrated in FIG. 1, the time period of the reset stage is fixed, so if the time period of the reset stage is set short, the power converter has a low power consumption during the short fault, but has difficulty to recover to the normal operation mode when the short fault is removed. If the time period of the reset stage is set long, the power converter can recover to the normal operation mode easily, but has a high power consumption during the short fault.

Therefore, it is desired to provide a short protection circuit that can recover to the normal operation mode easily when the short fault is removed, and has a relative low power consumption when the short condition occurs.

SUMMARY

In accomplishing the above and other objects, there has been provided a short protection method for a power converter. The power converter has at least one switch and is configured to provide an output voltage and an output current by controlling on and off switching of the at least one switch. The power converter works in a hiccup protection mode when a short fault occurs, and the hiccup protection mode has a sleep stage and a reset stage. The short protection method comprises detecting the output voltage during the hiccup protection mode, and setting the time period of the reset stage based on the detected output voltage. Wherein the time period of the reset stage increases with the increase of the detected output voltage.

There has also been provided a short protection circuit used in a power converter. The power converter has at least one switch and is configured to provide an output voltage and an output current by controlling on and off switching of the at least one switch, wherein the power converter works in a hiccup protection mode having a sleep stage and a reset stage when a short fault occurs, and wherein the at least one switch is controlled to be turned off in the sleep stage and controlled to be switched on and off in the reset stage. The short protection circuit comprises a sleep control circuit and a reset control circuit. The sleep control circuit is configured to control the power converter to work in the sleep stage and to generate a sleep control signal to control the time period of the sleep stage. The reset control circuit has an input terminal to receive the output voltage during the hiccup protection mode, and is configured to control the power converter to work in the reset stage and to generate a reset control signal to control the time period of the reset stage based on the received output voltage, wherein the time period of the reset stage increases with the increase of the received output voltage.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 2:
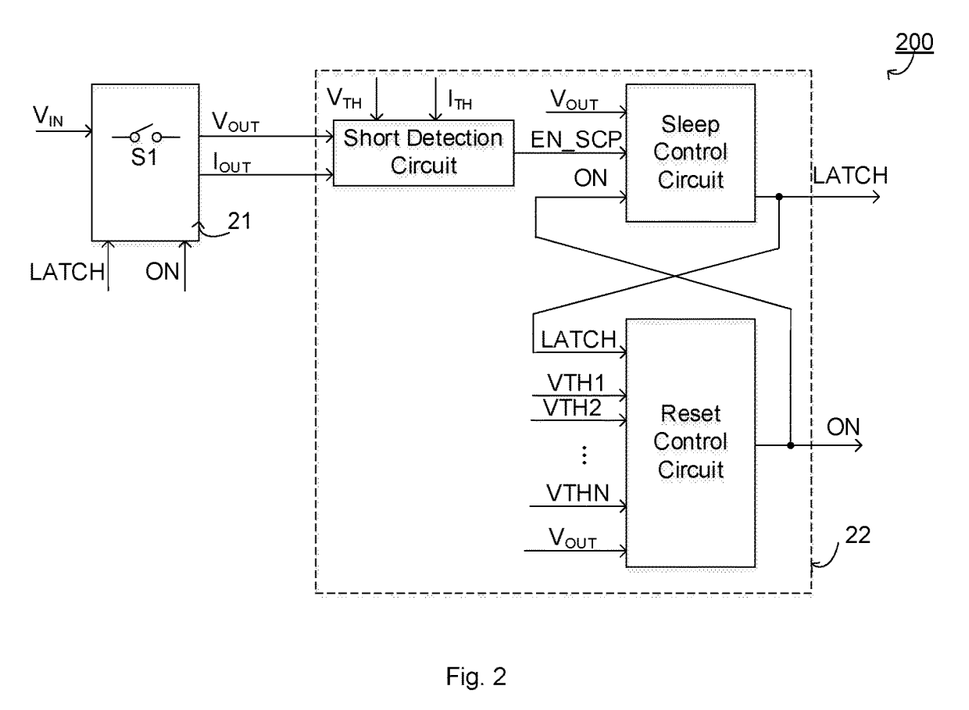
FIG. 2 illustrates a schematic diagram of a power converter 200 having a short protection circuit in accordance with an embodiment of the present invention.

FIG. 2 illustrates a schematic diagram of a power converter 200 having a short protection circuit in accordance with an embodiment of the present invention. In the exemplary embodiment of FIG. 2, the power converter 200 comprises a switching circuit 21 and a short protection circuit 22. The switching circuit 21 comprises at least one switch S1 and is configured to convert an input voltage $V_{IN}$ to an output voltage $V_{OUT}$ with an output current $I_{OUT}$ by controlling on and off switching of the at least one switch S1. The short protection circuit 22 is configured to control the power converter 200 to work in the hiccup protection mode when the short fault occurs, specifically, the short protection circuit 22 is configured to generate a sleep control signal LATCH and a reset control signal ON to the switching circuit 21 to control the switching circuit 21 to work in the hiccup protection mode. In FIG. 2, the short protection circuit 22 comprises a sleep control circuit and a reset control circuit. The sleep control circuit is configured to receive the output voltage $V_{OUT}$ and a short indication signal EN_SCP indicative of whether the short fault occurs, and is configured to generate the sleep control signal LATCH based on the received output voltage $V_{OUT}$ during the hiccup protection mode. In an embodiment, the time period of the sleep stage varies with the received output voltage $V_{OUT}$ during the hiccup protection mode, in special, when the received output voltage $V_{OUT}$ during the hiccup protection mode increases, the time period of the sleep stage increases. The sleep control circuit may be further configured to receive the reset control signal ON to start one sleep stage when one reset stage ends.

The reset control circuit has an input terminal to receive the output voltage $V_{OUT}$ during the hiccup protection mode, and is configured to generate the reset control signal ON to control the time period of the reset stage based on the received output voltage $V_{OUT}$ during the hiccup protection mode, and when the received output voltage $V_{OUT}$ during the hiccup protection mode increases, the time period of the reset stage increases. In the exemplary embodiment of FIG. 3, the reset control circuit has N input terminals to receive N short voltage thresholds VTH1, VTH2, . . . , VTHN respectively, wherein N is an integer greater than 1, and VTH1<VTH2< . . . <VTHN. The reset control circuit may generate the reset control signal ON by comparing the received output voltage $V_{OUT}$ during the hiccup mode with the N short voltage thresholds VTH1, VTH2, . . . , VTHN respectively. The reset control circuit may be further configured to receive the sleep control signal LATCH to start one reset stage when one sleep stage ends.

In FIG. 2, the short protection circuit 22 may further comprise a short detection circuit coupled to the switching circuit 21 to receive the output voltage $V_{OUT}$ and the output current $I_{OUT}$, and is configured to generate the short indication signal EN_SCP based on the output voltage $V_{OUT}$ and/or the output current $I_{OUT}$. In an embodiment, when the output voltage $V_{OUT}$ is lower than a fault voltage reference $V_{TH}$ and/or the output current $I_{OUT}$ is higher than a fault current reference $I_{TH}$, the short indication signal EN_SCP indicates that the short fault occurs, and the switching circuit 21 is controlled to work in the hiccup protection mode by the short protection circuit 22.

Figure 3:
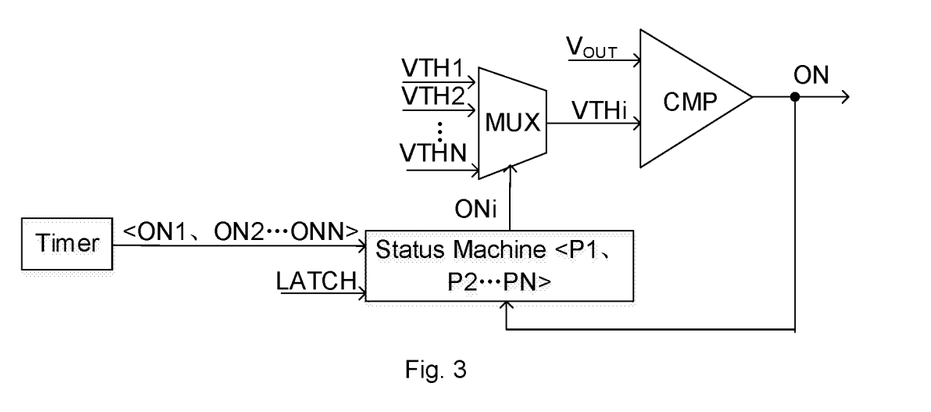
FIG. 3 illustrates a schematic diagram of the reset control circuit in FIG. 2 in accordance with an embodiment of the present invention.

FIG. 3 illustrates a schematic diagram of the reset control circuit in FIG. 2 in accordance with an embodiment of the present invention. In the exemplary embodiment of FIG. 3, the reset control circuit is configured to generate the reset control signal ON to control the time period of the reset stage based on the received output voltage $V_{OUT}$ during the hiccup protection mode and the N short voltage thresholds VTH1, VTH2, . . . , VTHN, wherein N is an integer greater than 1. The reset stage may comprise N auto-start phases P1, P2, . . . , PN depending on the received output voltage $V_{OUT}$ during the hiccup protection mode. In FIG. 3, the reset control circuit may comprise a status machine, a selection circuit MUX and a comparator CMP. The status machine has an input terminal to receive the sleep control signal LATCH, a clock input terminal to receive N clock signals ON1, ON2, ONN for controlling the time period of the N auto-start phases P1, P2, . . . , PN respectively, and further has an output terminal. The selection circuit MUX has N input terminals to receive the N short voltage thresholds VTH1, VTH2, . . . , VTHN respectively, and a control input terminal coupled to the output terminal of the status machine, and an output terminal. The comparator CMP has an input terminal to receive the $i^{th}$ short voltage threshold VTHi and an input terminal to receive the output voltage $V_{OUT}$ during the hiccup protection mode, and an output terminal to output the reset control signal ON.

Still referring to FIG. 3, the working principle of the reset control circuit will be illustrated as below. When the $i^{th}$ clock signal ONi comes, i is an integer from 1 to N−1, the status machine is controlled to output the $i^{th}$ clock signal ONi to the selection circuit MUX, the selection circuit MUX is controlled to output the $i^{th}$ short voltage threshold VTHi to the comparator CMP, and the comparator CMP is configured to be compared the received output voltage $V_{OUT}$ during the hiccup protection mode with the $i^{th}$ short voltage threshold VTHi. If the received output voltage $V_{OUT}$ during the hiccup protection mode is lower than the $i^{th}$ short voltage threshold VTHi, the reset control signal ON controls the reset stage to end, the time period of the reset stage equals (T1+T2+ . . . +Ti), wherein Ti is the time period when the power converter working in the $i^{th}$ auto-start phase Pi. And if the received output voltage $V_{OUT}$ during the hiccup protection mode is higher than the $i^{th}$ short voltage threshold VTHi, the $(i+1)^{th}$ clock signal ON(i+1) comes. In the exemplary embodiment illustrated in FIG. 3, the reset control circuit further comprises a timer, which is configured to provide the N clock signals ON1, ON2, . . . , ONN. Persons of ordinary skill in the art should know that, the timer can be integrated to the status machine in other embodiments.

Still referring to FIG. 3, the working principle of the reset control circuit may further comprise: the selection circuit MUX is controlled by the $N^{th}$ clock signal ONN to output the $N^{th}$ short voltage threshold VTHN to the comparator CMP, the comparator CMP is configured to be compared the received output voltage $V_{OUT}$ during the hiccup protection mode with the $N^{th}$ short voltage threshold VTHN. If the received output voltage $V_{OUT}$ during the hiccup protection mode is higher than the $N^{th}$ short voltage threshold VTHN, the reset control signal ON controls the power converter to exit the hiccup protection mode. If the received output voltage $V_{OUT}$ during the hiccup protection mode is lower than the $N^{th}$ short voltage threshold VTHN, the reset control signal ON controls the reset stage to end. The output voltage $V_{OUT}$ is maintained at a predetermined voltage reference $V_{SET}$ when the power converter works in the normal operation mode, and the time from power on to the output voltage $V_{OUT}$ rising to the predetermined voltage reference $V_{SET}$ is defined as a startup period. For a specific power converter, the startup period varies when the power converter has different loads. For example, if the load is a capacitor, the startup period increases with the increase of the capacitance of the capacitor. In an embodiment, the $N^{th}$ short voltage threshold VTHN is lower than half of the predetermined voltage reference $V_{SET}$.

Figure 4:
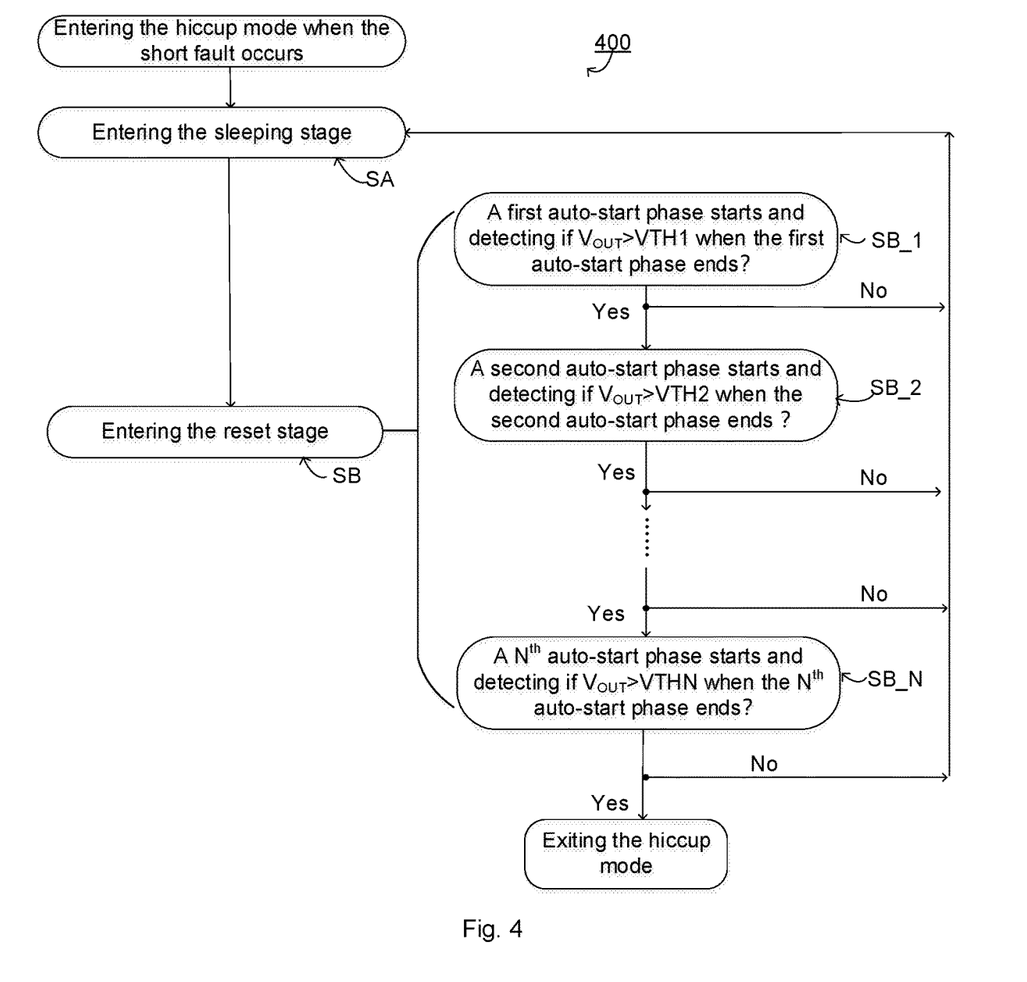
FIG. 4 illustrates a flow chart of a short protection method 400 used in a power converter in accordance with an embodiment of the present invention.

FIG. 4 illustrates a flow chart of a short protection method 400 used in a power converter in accordance with an embodiment of the present invention. The flow chart of the short protection method 400 will be explained with reference to the power converter 200 illustrated in FIG. 2 and the reset control circuit illustrated in FIG. 3 for better understanding. As shown in FIG. 2, the power converter 200 is configured to provide the output voltage $V_{OUT}$ and the output current $I_{OUT}$ at the output terminal, the power converter 200 may comprise at least one switch S1, and is configured to convert the input voltage $V_{IN}$ to the output voltage $V_{OUT}$ by controlling on and off switching of the at least one switch S1. The output voltage $V_{OUT}$ is maintained at the predetermined voltage reference $V_{SET}$ when the power converter works in the normal operation mode, and the time from power on to the output voltage $V_{OUT}$ rising to the predetermined voltage reference $V_{SET}$ is defined as a startup period. For a specific power converter, the startup period varies when the power converter has different loads. For example, if the load is a capacitor, the startup period increases with the increase of the capacitance of the capacitor. When the short fault occurs, the power convert enters the hiccup protection mode and works in the hiccup protection mode with the sleep stage and the reset stage until the short fault is removed. The short protection method comprises steps SA and SB. In the step SA, the power converter is controlled to enter the sleep stage. In an embodiment, when the power converter works in the sleep stage, the at least one switch S1 is controlled to be turned off. In the step SB, the power converter is controlled to enter the reset stage, wherein when the output voltage $V_{OUT}$ during the hiccup protection mode increases, the time period of the reset stage increases. In an embodiment, the power converter attempts to restart when the power converter works in the reset stage and the at least one switch S1 is controlled to be switched on and off.

In an exemplary embodiment of FIG. 4, the power converter has N short voltage thresholds VTH1, VTH2, . . . , VTHN, wherein N is an integer greater than 1, and VTH1<VTH2< . . . <VTHN. The time period of the reset stage is determined by comparing the output voltage $V_{OUT}$ during the hiccup protection mode with the N short voltage thresholds VTH1, VTH2, . . . , VTHN respectively. The step SB may comprise steps SB_1, SB_2, . . . , and SB_N for controlling N auto-start phases P1, P2, . . . , PN respectively, wherein in the step SB_i, the $i^{th}$ auto-start phase Pi starts, and the output voltage $V_{OUT}$ during the hiccup protection mode is configured to be compared with the $i^{th}$ short voltage threshold VTHi when the $i^{th}$ auto-start phase Pi ends, wherein i is an integer from 1 to N−1. The time period when the power converter working in the $i^{th}$ auto-start phase Pi is defined as the $i^{th}$ auto-start period Ti. If the output voltage $V_{OUT}$ during the hiccup protection mode is higher than the $i^{th}$ short voltage threshold VTHi, the power converter enters the step SB_(i+1), else the power converter returns to the step SA. If the power converter returns to the step SA, the reset stage ends, and the time period of the reset stage is the sum of the i auto-start periods, i.e., (T1+T2+ . . . +Ti). In the step SB_N, the $N^{th}$ auto-start phase PN starts, and the output voltage $V_{OUT}$ during the hiccup protection mode is configured to be compared with the $N^{th}$ short voltage threshold VTHN when the $N^{th}$ auto-start phase PN ends. If the output voltage $V_{OUT}$ during the hiccup protection mode is higher than the $N^{th}$ short voltage threshold VTHN, the power converter exits the hiccup protection mode. If the output voltage $V_{OUT}$ during the hiccup protection mode is lower than the $N^{th}$ short voltage threshold VTHN, the power converter exits the reset stage and enters the sleep stage.

For a specific power converter, the startup period varies with different loads. For example, if the load is a capacitor, the startup period increases with the increase of capacitance of the capacitor. In an embodiment, the $N^{th}$ short voltage threshold VTHN is lower than half of the predetermined voltage reference $V_{SET}$. In an embodiment, the sum of the N auto-start periods i.e., (T1+T2+ . . . +TN) is lower than the startup period. In an embodiment, the time period of the sleep stage is fixed. In another embodiment, when the output voltage $V_{OUT}$ during the hiccup protection mode increases, the time period of the sleep stage increases.

Figure 5:
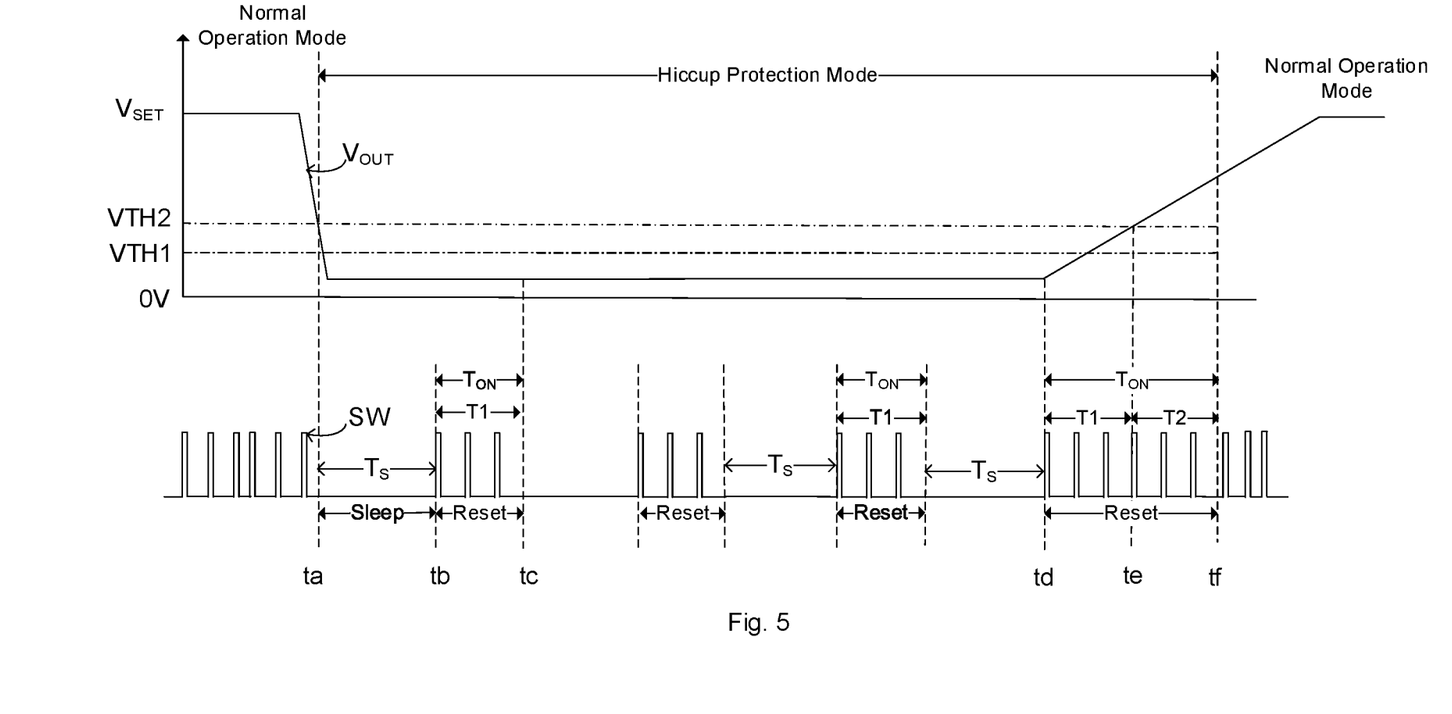
FIG. 5 illustrates a waveform diagram of the output voltage $V_{OUT}$ and the switching control signal SW of the power converter 200 in FIG. 2 when the output voltage $V_{OUT}$ during the hiccup protection mode is lower than the first short voltage threshold VTH1 in accordance with an embodiment of the present invention.

FIG. 5 illustrates a waveform diagram of the output voltage $V_{OUT}$ and the switching control signal SW of the power converter 200 in FIG. 2 when the output voltage $V_{OUT}$ during the hiccup protection mode is lower than the first short voltage threshold VTH1 in accordance with an embodiment of the present invention. For the exemplary power converter in FIG. 5, N=2, so the power converter in FIG. 5 has the first short voltage threshold VTH1 and the second short voltage threshold VTH2, and the reset stage may comprise the first auto-start phase P1 and the second auto-start phase P2 depending on the output voltage $V_{OUT}$ during the hiccup protection mode, the time period when the power converter working in the first auto-start phase P1 is defined as the first auto-start period T1 while the time period when the power converter working in the second auto-start phase P2 is defined as the second auto-start period T2. The power converter works in the hiccup protection mode comprising the sleep stage and the reset stage when the short fault occurs, and works in the normal operation mode when the short fault is removed. When the power converter works in the normal operation mode, the switching control signal SW is a square signal and the output voltage $V_{OUT}$ is maintained at the predetermined voltage reference $V_{SET}$. When the power converter works in the sleep stage, the switching control signal SW is latched to be low, and when the power converter works in the reset stage, the power converter attempts to restart, the switching control signal SW is a square signal, and the at least one switch S1 is switched on and off. In FIG. 5, the power converter works in the normal operation mode until the moment ta when the short fault occurs. At the moment ta, the power converter enters the hiccup protection mode, the power converter works in the hiccup protection mode with sleep stages and reset stages until the moment Tf. The time period when the power converter working in the sleep stage is defined as a sleep period $T_S$, while the time period when the power converter working in the reset stage is defined as a reset period $T_{ON}$. After the sleep period $T_S$ from the moment ta, the sleep stage ends at the moment tb and the reset stage starts, after the first auto-start period T1 from the moment tb, the first auto-start phase P1 ends, and because the output voltage $V_{OUT}$ is lower than the first short voltage threshold VTH1 when the first auto-start phase P1 ends, the reset stage ends and one sleep stage starts at the moment tc. From the moment ta to the moment td, the reset stages alternates with the sleep stages, the power converter works in the sleep stage with the sleep period $T_S$ and works in the reset stage with the reset period $T_{ON}$, and because the output voltage $V_{OUT}$ is lower than the first short voltage threshold VTH1 when each first auto-start phase P1 ends, each reset stage comprises the first auto-start phase P1 with the reset period $T_{ON}$ equaling to the first auto-start period T1. And because the output voltage $V_{OUT}$ is higher than the first short voltage threshold VTH1 when the first auto-start phase P1 ends at the moment te, and the output voltage $V_{OUT}$ is also higher than the second short voltage threshold VTH2 when the second auto-start phase P2 ends at the moment tf, thus the power converter exits the hiccup protection mode at the moment tf and recovers to the normal operation mode.

Figure 6:
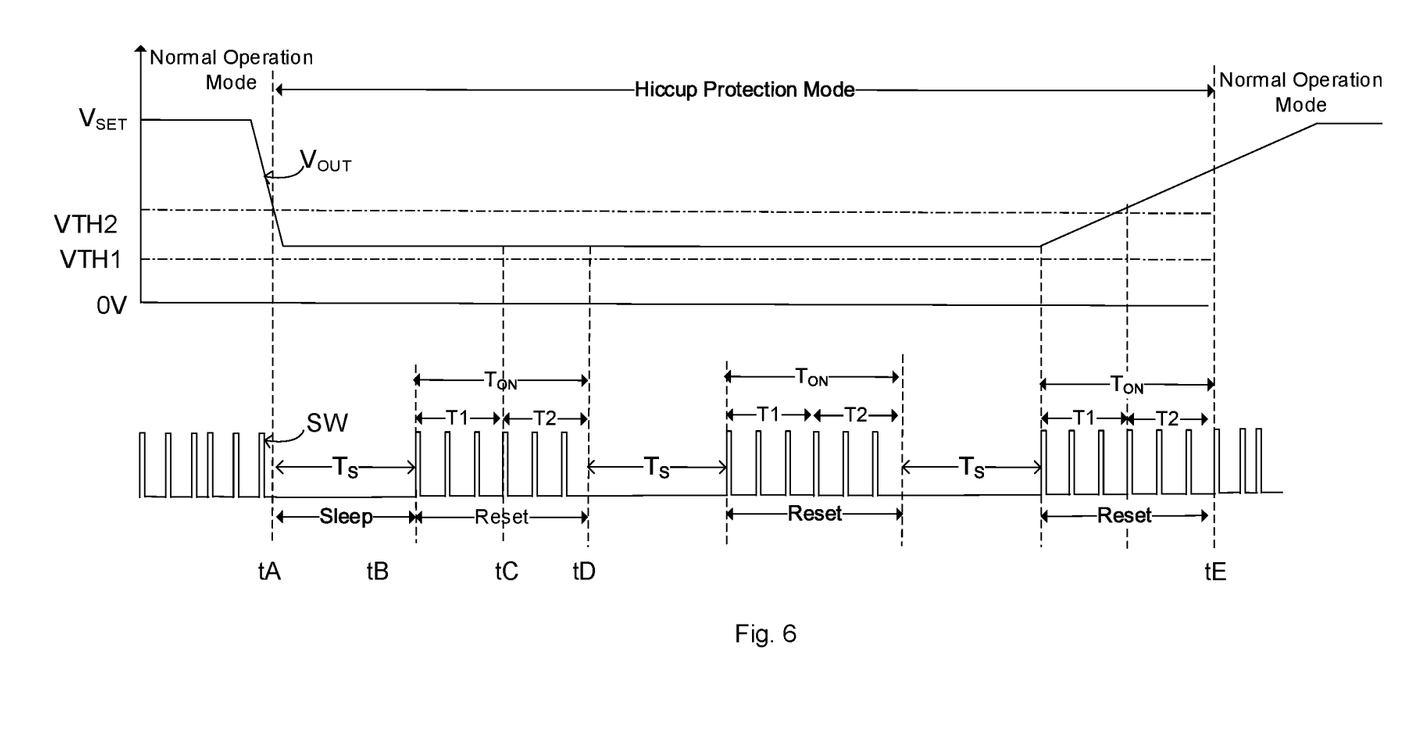
FIG. 6 illustrates a waveform diagram of the output voltage $V_{OUT}$ and the switching control signal SW of the power converter 200 in FIG. 2 when the output voltage $V_{OUT}$ during the hiccup protection mode is between the first short voltage threshold VTH1 and the second short voltage threshold VTH2 in accordance with an embodiment of the present invention.

FIG. 6 illustrates a waveform diagram of the output voltage $V_{OUT}$ and the switching control signal SW of the power converter 200 of FIG. 2 when the output voltage $V_{OUT}$ during the hiccup protection mode is between the first short voltage threshold VTH1 and the second short voltage threshold VTH2 in accordance with an embodiment of the present invention. For the exemplary power converter in FIG. 6, N=2, so the power converter in FIG. 6 has the first short voltage threshold VTH1 and the second short voltage threshold VTH2 the same as the FIG. 5. In FIG. 6, the power converter works in the normal operation mode until the moment TA when the short fault occurs. At the moment TA, the power converter enters the hiccup protection mode and works in the hiccup protection mode with sleep stages and reset stages until the moment tE. The time period when the power converter working in the sleep stage is defined as a sleep period $T_S$, while the time period when the power converter working in the reset stage is defined as a reset period $T_{ON}$. After the sleep period Ts from the moment tA, the sleep stage ends at the moment tB and the reset stage starts, after the first auto-start period T1 from the moment tB, the first auto-start phase P1 ends, and because the output voltage $V_{OUT}$ at the moment tC is higher than the first short voltage threshold VTH1, the second auto-start phase P2 starts at the moment tC and after the second auto-start period T2 from the moment tC, because the output voltage $V_{OUT}$ at the moment tD is lower than the second short voltage threshold VTH2, the reset stage ends with the reset period $T_{ON}$ equaling to the sum of the first auto-start period T1 and the second auto-start period T2, i.e., $T_{ON}$=(T1+T2). From the moment TA to the moment TE, the power converter works in the sleep stage with the sleep period $T_S$ and the reset stage with the reset period $T_{ON}$ equaling to the sum of the first auto-start period T1 and the second auto-start period T2 repeatedly, and because the output voltage $V_{OUT}$ is higher than the second short voltage threshold VTH2 at the moment tE, the power converter exits the hiccup protection mode at the moment tE and recovers to the normal operation mode.

For the time period of the reset stage is adaptive depending on the output voltage during the hiccup protection mode, the short protection circuit in accordance with various embodiment of the present invention may have a relative low power consumption when the power converter works in the hiccup protection mode, and can recovers to the normal operation mode easily when the short fault is removed.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A short protection method for a power converter, wherein the power converter has at least one switch and is configured to provide an output voltage and an output current by controlling on and off switching of the at least one switch, and wherein the power converter works in a hiccup protection mode when a short fault occurs, and the hiccup protection mode has a sleep stage and a reset stage, the short protection method comprising:
   detecting the output voltage during the hiccup protection mode; and
   setting the time period of the reset stage based on the detected output voltage;
   wherein the time period of the reset stage increases with the increase of the detected output voltage.

2. The short protection method of claim 1, wherein the reset stage comprises N auto-start phases P1, P2, . . . , PN in response to N short voltage thresholds VTH1, VTH2, . . . , VTHN respectively, wherein N is an integer greater than 1, and VTH1<VTH2< . . . <VTHN, and wherein the time period of the reset stage is further determined by the N short voltage thresholds VTH1, VTH2, . . . , VTHN.

3. The short protection method of claim 2, wherein the step of setting the time period of the reset stage based on the detected output voltage comprises:

comparing the detected output voltage with the $i^{th}$ short voltage threshold VTHi when the $i^{th}$ auto-start phase Pi ends, wherein i is an integer from 1 to N−1;

exiting the reset stage and entering the sleep stage if the detected output voltage is lower than the $i^{th}$ short voltage threshold VTHi; and entering the $(i+1)^{th}$ auto-start phase P(i+1) if the detected output voltage is higher than the $i^{th}$ short voltage threshold VTHi.

4. The short protection method of claim 3, wherein the step of setting the time period of the reset stage based on the detected output voltage further comprises:

comparing the detected output voltage with the $N^{th}$ short voltage threshold VTHN when the $N^{th}$ auto-start phase PN ends;

exiting the reset stage and entering the sleep stage if the detected output voltage is lower than the $N^{th}$ short voltage threshold VTHN; and exiting the hiccup protection mode if the detected output voltage is higher than the $N^{th}$ short voltage threshold VTHN.

5. The short protection method of claim 2, wherein the output voltage is maintained at a predetermined voltage reference when the power converter works in a normal operation mode, the $N^{th}$ short voltage threshold VTHN is lower than half of the predetermined voltage reference.

6. The short protection method of claim 1, wherein the time period of the sleep stage is fixed.

7. The short protection method of claim 1, wherein when the detected output voltage increases, the time period of the sleep stage increases.

8. The short protection method of claim 1, wherein when the output voltage is lower than a fault voltage reference, the short fault occurs.

9. The short protection method of claim 1, wherein when the output current is higher than a fault current reference, the short fault occurs.

10. The short protection method of claim 1, wherein when the power converter works in the sleep stage, the at least one switch is controlled to be turned off, and when the power converter works in the reset stage, the at least one switch is controlled to be switched on and off.

11. A short protection circuit used in a power converter, wherein the power converter has at least one switch and is configured to provide an output voltage and an output current by controlling on and off switching of the at least one switch, wherein the power converter works in a hiccup protection mode having a sleep stage and a reset stage when a short fault occurs, and wherein the at least one switch is controlled to be turned off in the sleep stage and controlled to be switched on and off in the reset stage, the short protection circuit comprising:

a sleep control circuit, configured to generate a sleep control signal to control the time period of the sleep stage; and a reset control circuit, having an input terminal to receive the output voltage during the hiccup protection mode, and configured to generate a reset control signal to control the time period of the reset stage based on the received output voltage, wherein the time period of the reset stage increases with the increase of the received output voltage.

12. The short protection circuit of claim 11, wherein the reset control circuit is further configured to receive N short voltage thresholds VTH1, VTH2, . . . , VTHN, wherein N is an integer greater than 1, and VTH1<VTH2< . . . <VTHN, and the reset control signal is further generated based on the N short voltage thresholds VTH1, VTH2, . . . , VTHN.

13. The short protection circuit of claim 12, wherein the reset stage comprises N auto-start phases P1, P2, . . . , PN, the reset control circuit comprises:

a status machine, having a clock input terminal to receive N clock signals ON1, ON2, . . . , ONN for controlling the N auto-start phases P1, P2, . . . , PN respectively, and an output terminal;

a selection circuit, having N input terminals to receive the N short voltage thresholds VTH1, VTH2, . . . , VTHN respectively and a control input terminal coupled to the output terminal of the status machine, and an output terminal; and a comparator, having a first input terminal coupled to the output terminal of the selection circuit, a second input terminal to receive the output voltage during the hiccup mode, and configured to generate the reset control signal at an output terminal;

wherein the selection circuit is configured to provide the $i^{th}$ short voltage threshold VTHi based on the $i^{th}$ clock signal ONi, wherein i is an integer from 1 to N, and the comparator is configured to generate the reset control signal by comparing the received output voltage with the $i^{th}$ short voltage threshold VTHi.

14. The short protection circuit of claim 13, wherein the reset control circuit further comprises a timer configured to generate the N clock signals ON1, ON2, . . . , ONN.

15. The short protection circuit of claim 11, wherein the time period of the sleep stage is fixed.

16. The short protection circuit of claim 11, wherein the sleep control circuit is configured to receive the output voltage during the hiccup protection mode, and configured to generate the sleep control signal based on the received output voltage.

17. The short protection circuit of claim 16, wherein the time period of the sleep stage increases with the increase of the received output voltage.

18. The short protection circuit of claim 11 further comprises a short detection circuit configured to generate a short indication signal to indicate whether the short fault occurs based on the output voltage, wherein when the output voltage is lower than a fault voltage reference, the short indication signal indicates that the short fault occurs.

19. The short protection circuit of claim 11 further comprises a short detection circuit configured to generate a short indication signal to indicate whether the short fault occurs based on the output current, wherein when the output current is higher than a fault current reference, the short indication signal indicates that the short fault occurs.

* * * * *